July 11, 1944.       L. F. BEACH       2,353,139
SHAFT MOUNTING
Filed Jan. 28, 1943

INVENTOR
LENNOX F. BEACH
BY
Herbert H. Thompson
HIS ATTORNEY

Patented July 11, 1944

2,353,139

UNITED STATES PATENT OFFICE 2,353,139

SHAFT MOUNTING

Lennox F. Beach, Port Washington, N. Y., assignor to Sperry Gyroscope Company, Inc., Brooklyn, N. Y., a corporation of New York Application January 28, 1943, Serial No. 474,054

14 Claims. (Cl. 308—230)

This invention relates generally to mountings for shafts and particularly is concerned with a thermally compensated mounting for gyrorotors. A shaft or rotor mounted in accordance with the teaching of the present invention remains equally free under all normal temperature conditions.

The primary object of the invention is to provide a mounting for present high speed gyrorotors in their bearing frames that is effective to prevent binding or looseness between the shaft supporting the rotor and its bearings due to differential expansion or contraction of the shaft and bearing frame relative to one another, during wide temperature changes, such as occur in the air spun gyroscopic attitude and navigational apparatus for airplanes.

A further object of the invention is to provide a mounting of this character in which the axial spacing between the bearings in the frame or case is initially increased beyond that which would occur at the maximum temperature range apt to be encountered, by expanding the frame or case and maintaining it so.

One of the features of the invention resides in provision of a compression strut as one of the parts of the shaft mounting.

Another feature of the invention consists in the provided adjustable means for engaging and compressing the strut, the same being operative to increase the normal axial spacing between the bearing parts of the mounting.

Figure 1:
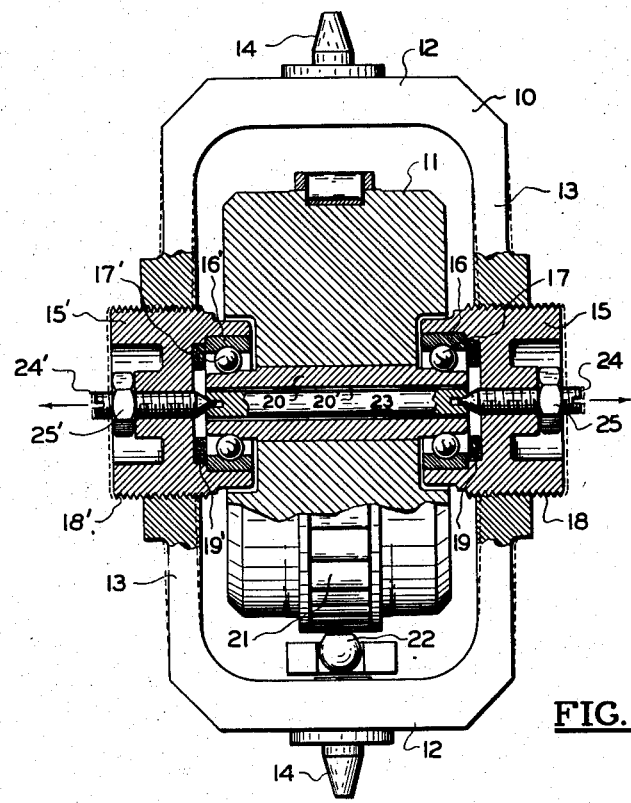
Figure 2:
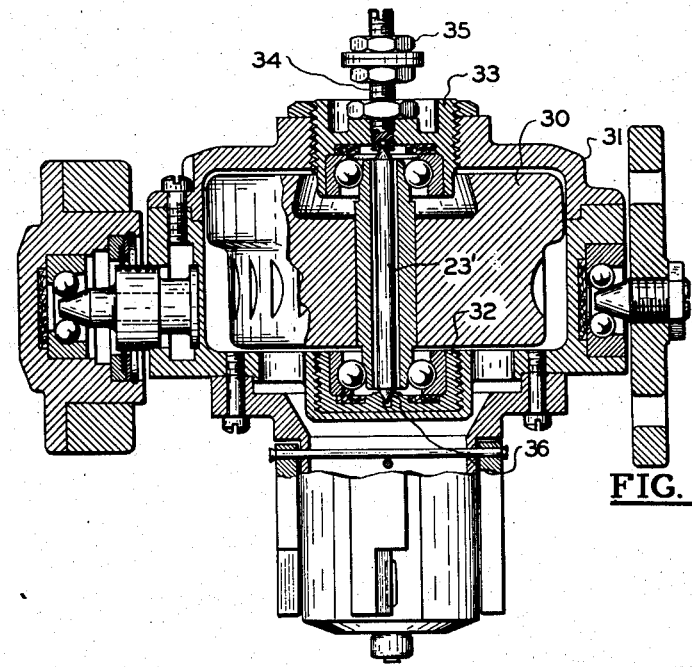

Other objects, features and structural details of the invention will be apparent from the following description when read in relation to the accompanying drawing, wherein:

Fig. 1 is a detail plan view, partly in section, showing one form of my invention embodied for purposes of illustration in the frame and gyrorotor of a directional type of gyroscope, and Fig. 2 is a detail elevational view, partly in section, showing a modified form of the invention adapted for use in the rotor bearing case and gyrorotor of a gyrovertical instrument.

With reference to Fig. 1, the improved shaft mounting is shown to include a frame 10 which encircles a gyrorotor 11. Frame 10 may be rectangular in cross-section with the respective ends 12 thereof being made of a greater cross-sectional area than the oppositely disposed sides 13. This permits the sides 13 of the frame to be expanded or assume a position such as shown by the dotted lines in Fig. 1 without bending or deforming the ends of the frame. Frame 10 is preferably constructed of a light aluminum alloy material for weight saving reasons, this material having a relatively high heat coefficient of expansion. Frame 10 may be provided with the customary horizontal trunnions 14. While the invention is illustratively depicted in connection with a gyrorotor, it will be understood that the same is not to be considered as limited thereto.

The bearing members of the improved mounting are situated in coaxial relation on the respective sides 13 of the frame. These axially spaced members each include a housing 15, 15', a fixed outer ball bearing race 16, 16' and ball bearings 17, 17'. Both bearing members are made axially adjustable, in this instance, the housings 15, 15' being exteriorly screw threaded as noted at 18, 18' and fitting in oppositely disposed coaxial tapped openings in the respective sides 13 of the frame. Oil pads 19, 19' are respectively provided to lubricate the spaced bearings. The frame may be considered to be any bearing holding piece which will resistively permit an increase in the normal spacing between the bearings.

The gyrorotor is supported on a shaft 20 to which it is suitably fixed. Buckets 21 are employed in this instance on the peripheral surface of the rotor to receive the air directed upon the same from a nozzle 22. The air impinging upon the buckets 21 consequently provides the motive power necessary to spin the illustrated well known type of gyrorotor. In accordance with the teaching of the present invention, shaft 20 is tubular in form. The axial opening in the shaft is indicated at 20'. A compression strut 23 is located in the axial opening within the shaft, the same being situated at the axis of the shaft and being fixedly mounted within the shaft, as hereinafter more particularly described. The respective ends of the axial open shaft 20 are journaled in the spaced bearing members 15 and 15'. As shown in Fig. 1, the journal forming ends of the shaft are conically shaped. The strut 23 and shaft 20 are preferably made of the same material, such as a high grade steel of a low heat coefficient of expansion relative to that of the frame 10. Both strut and shaft are also constructed to have substantially the same length, and being of the same material and therefore having the same coefficient of expansion, expand or contract equally when subjected to a change in thermal conditions effecting either result.

Means are also provided for compressively engaging the opposite ends of the strut 23 which in this instance is centrally recessed. Such means, as shown in Fig. 1, are provided in the form of adjustable pins 24, 24' which are mounted upon the frame 10, and particularly in the respective bearing housings 15, 15'. The pins 24, 24' are screw threaded and engage threaded openings in the respective housings, the same being coaxial with the strut 23 and shaft 20. The threaded connection of the means in the frame makes the same adjustable with respect to the strut. The conically pointed, inwardly disposed ends of the pins 24, 24' are adapted to compressively engage the recessed ends of the strut to effectively expand the frame in the direction indicated by the arrows in Fig. 1 and permit the desired adjustment of the axial spacing of the bearing members.

In setting the parts of the temperature compensating mounting, the bearing housings 15, 15', in this instance, are screwed inwardly until the frame is forced slightly open. This lightly preloads the bearings and locks the shaft 20. The housings are individually and jointly manipulated in this manner until the shaft and rotor thereon are in a central position within the frame. The adjustable means or pins 24, 24' which were lightly turned down on the strut 23 previous to the first operation are then further adjusted by moving the same in a direction to compress the strut. The pins 24, 24' are tightened until the preload on the bearings is taken up by the strut. Effectively this is accomplished by further expansion of the frame 10 in the direction of the arrows in Fig. 1. The pins 24, 24' have then been turned to effectively increase the axial distance between the respective ends of the strut and the frame to thereby control the spacing of the bearing members.

After proper setting of the mounting at a moderate temperature, if the same is then subjected to colder temperature conditions, the stress in the frame, which then tends to contract more than the shaft and strut, is resisted by the adjusting means and strut. In such event, the pressure between these parts increases and the frame is prevented from contracting sufficiently to become bound to the rotor shaft, or increase the bearing load. Under opposite temperature conditions, the frame expands to a greater extent than the shaft and strut. This tends to relieve the pressure between the adjustable means and strut and does not effect the spacing between the respective bearing members. It will be understood that the initial pressure set between the strut and adjustable means is sufficient to remain positive at all times.

After proper adjustment of the mounting is accomplished the lock nuts 25, 25' are positioned on the pins 24, 24', the same not disturbing the proper setting of the mounting.

In the embodiment of the invention shown in Fig. 2, the gyrorotor 30 is mounted in the rotor bearing case 31 of a gyrovertical instrument. The improved mounting is substantially similar to that previously described, the parts being arranged vertically, in this instance, instead of horizontally. Strut 23' is provided with conically shaped pointed ends in this showing of the invention. One of the housings of the axially spaced bearing members is fixed in position in the base of the case 31, as indicated at 32. The other housing, as indicated at 33, is similar to either one of the type previously described. The adjustable pin 34 has an inwardly disposed central recess in this instance that receives the top end of the strut 23'. The upwardly extending portion of the pin 34 may be employed to hold the balancing weights 35 for the rotor bearing case. The bearing housing 32 in case 31 is further provided with a jewel post 36 that receives the lower end of the strut 23'. This construction with the pin 34 provides the axially adjustable means for compressively engaging the strut in the manner heretofore described.

As many changes could be made in the above construction and many apparently widely different embodiments of this invention coluld be made without departing from the scope thereof, it is intended that all matter contained in the above description or shown in the accompanying drawing shall be interpreted as illustrative and not in a limiting sense.

What is claimed is:

1. A temperature compensated mounting for an axially open shaft including a pair of axially spaced, relatively movable bearing members in which the ends of the shaft are journalled, a compression strut coaxial with said shaft, and means for engaging the ends of the strut to effectively move the bearing members relative to one another axially to adjustably increase the spacing thereof.

2. A mounting for gyrorotors including a frame, a pair of axially spaced bearing members mounted on said frame, a hollow rotor shaft having ends that journal in said spaced bearing members, an axially positioned strut extending through but spaced from said shaft, and means mounted on said frame for compressively engaging the respective ends of said strut to maintain the frame elastically spread, whereby contraction of the frame and binding of the bearings on said shaft due to intense cold is prevented.

3. A mounting for gyrorotors including a rotor case having a pair of axially spaced bearing members, a tubular rotor shaft having ends that journal in said spaced bearing members, a compression strut extending axially through the shaft, and adjustable compressing means on said frame for engaging the ends of said strut to permanently increase the axial distance between the respective ends of the strut and the frame and thereby maintain proper spacing of the bearing members during wide temperature changes, 4. A temperature compensated gyrorotor mounting including a case, a pair of axially spaced bearing members fixed to said case, a hollow rotor shaft having ends journalling in said spaced bearing members, a compression strut, of substantially the same length as the shaft, and extending therethrough, and axially adjustable means on said case coaxial with said strut for compressively engaging the strut at the respective ends thereof.

5. A gyrorotor mounting of the character claimed in claim 4, in which the engaged ends of said strut are centrally recessed.

6. A gyrorotor mounting of the character claimed in claim 4, in which the engaged ends of said strut are tapered.

7. A temperature compensated gyrorotor mounting including a frame, two coaxial, axially adjustable, spaced bearing members mounted on said frame, an axially open rotor shaft having ends journalling in said spaced bearing members, a compression strut located in the axial opening of the shaft, and axially adjustable means on said frame coaxial with said strut for compressively engaging the strut at the respective ends thereof to effectively expand the frame and control the axial spacing between the bearing members.

8. A gyrorotor mounting of the character claimed in claim 7, in which the axially adjustable means are a pair of screw threaded pins.

9. A temperature compensated gyrorotor mounting including a case, two axially spaced bearing members mounted on said case, one of which is fixed and the other of which is axially adjustable, an axially open rotor shaft having ends journalling in said spaced bearing members, a compression strut situated at the axis of the shaft, and axially adjustable means on said case coaxial with said strut for compressively engaging the strut at the respective ends thereof to effectively expand the case and control the axial spacing between the bearing members.

10. A gyrorotor mounting of the character claimed in claim 9, in which the axially adjustable means is a screw threaded pin and a jewel post fixedly mounted with respect to the case that receives one end of the strut.

11. A temperature compensated mounting for an axially open shaft including a pair of axially spaced, relatively movable bearing members in which the ends of the shaft are journaled, a compression strut coaxial with said shaft, and means for engaging the ends of the strut to effectively spread the bearing members relative to one another axially to permanently maintain the normal spacing thereof.

12. Gyrorotor mounting of the character claimed in claim 4, in which said rotor shaft and strut have the same coefficient of expansion.

13. A temperature compensated mounting for a hollow rotor shaft comprising a supporting frame, a pair of axially spaced bearing members mounted therein in which the ends of said shaft are journaled, a compression strut extending axially through said shaft but spaced therefrom, and spreading means engaging at least one end of the shaft and one bearing member to effectively prevent contraction of said frame from lessening the spacing of said bearing members.

14. A shaft mounting as claimed in claim 13, in which said spreading means places said bearing members and frame under a spreading strain sufficient to prevent binding of the bearings under all temperature conditions.

LENNOX F. BEACH.